United States Patent
Stopic et al.

(10) Patent No.: US 11,537,867 B2
(45) Date of Patent: Dec. 27, 2022

(54) SYSTEM AND METHOD FOR ONLINE ANALYSIS

(71) Applicant: VISA INTERNATIONAL SERVICE ASSOCIATION, San Francisco, CA (US)

(72) Inventors: Richard Stopic, San Francisco, CA (US); Rajesh Kumar Aroli Veettil, Singapore (SG); Madhvesh Navkal Badri, San Francisco, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 1086 days.

(21) Appl. No.: 15/717,690

(22) Filed: Sep. 27, 2017

(65) Prior Publication Data

US 2019/0095789 A1    Mar. 28, 2019

(51) Int. Cl.
*G06N 3/08* (2006.01)
*G06N 5/02* (2006.01)

(52) U.S. Cl.
CPC ............... *G06N 3/08* (2013.01); *G06N 5/022* (2013.01)

(58) Field of Classification Search
CPC .......... G06N 20/00; G06N 3/08; G06N 5/022; G06Q 30/06; G06Q 20/40; G06Q 20/3674; G06Q 30/0269; H04L 51/02
See application file for complete search history.

(56) References Cited

U.S. PATENT DOCUMENTS

| | | |
|---|---|---|
| 7,249,113 B1 | 7/2007 | Continelli et al. |
| 10,204,337 B1* | 2/2019 | Spector ............. G06Q 20/3821 |
| 2007/0011104 A1* | 1/2007 | Leger ................... G06Q 20/085 |
| | | 705/77 |
| 2007/0288641 A1 | 12/2007 | Lee et al. |
| 2008/0059351 A1 | 3/2008 | Richey et al. |
| 2008/0288299 A1 | 11/2008 | Schultz |
| 2011/0047044 A1 | 2/2011 | Wright et al. |
| 2017/0032375 A1* | 2/2017 | Van Os ............. G06Q 20/3223 |
| 2017/0255911 A1* | 9/2017 | Kassemi ............. G06Q 20/384 |
| 2017/0330196 A1* | 11/2017 | Larko ..................... H04L 67/10 |
| 2018/0107652 A1* | 4/2018 | Karov .................... G06F 40/211 |
| 2018/0225365 A1* | 8/2018 | Altaf .................. G06F 16/3344 |
| 2018/0367483 A1* | 12/2018 | Rodriguez ........... H04L 51/046 |

OTHER PUBLICATIONS

International Search Report and Written Opinion, dated Jan. 11, 2019, in PCT Application No. PCT/US2018/052734, 11 pages.

* cited by examiner

*Primary Examiner* — Kevin W Figueroa
(74) *Attorney, Agent, or Firm* — Kilpatrick Townsend & Stockton LLP

(57) ABSTRACT

A method is disclosed. The method includes receiving, from a user computer that is a party to a transaction, information that can be used to identify a transaction between the user computer and a resource provider computer. The method further includes determining one or more attributes. The method additionally includes presenting a first question based on the one or more attributes. The method also includes receiving a response to the first question, presenting a second question based on the received response, and receiving a response to the second question. The method further includes storing the received responses in a data storage element, wherein the data storage element is accessible by an authorizing entity computer.

19 Claims, 6 Drawing Sheets

SYSTEM AND METHOD FOR ONLINE ANALYSIS

CROSS-REFERENCES TO RELATED APPLICATIONS

Not applicable.

BACKGROUND

Traditional processes for dispute resolution are slow and require interaction between the party initiating the dispute and the party mediating the dispute. The collection of facts pertinent to a particular dispute is also difficult. For example, in the context of a dispute involving a user and a merchant, users are generally required to place a call to the party mediating the dispute (e.g., an issuer) and provide basic and redundant information regarding the transaction being disputed. Additionally, the user may be required to provide signed letters before disputes can be initiated. User dispute letters often contain many facts that are not relevant to resolving the dispute; or conversely, these letters may be missing requests for information needed to resolve a particular dispute. Furthermore, many issuers use their own form letters. These letters cause difficulties for merchants by providing inconsistent information in different formats. Acquirers and processors also use different proprietary letters to communicate with issuers, adding to the complexity of conventional dispute resolution processes. Depending upon the type of dispute, the entire process of gathering the needed information for the entity that will ultimately decide the dispute may take several minutes to hours, depending upon the circumstances.

The tedious process of providing the information to the party mediating the dispute prior to any action regarding the resolution of the dispute often results in user frustration. The user may feel that they wasted time contacting the party mediating the dispute and providing information about the transaction, only to wait for an uncertain amount of time for the dispute to be resolved. Additionally, conventional dispute resolution processes are not efficient because a live person representing the party mediating the dispute is required to gather facts pertaining to the dispute from the user.

Embodiments of the invention address these and other problems.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for automated analysis using machine learning, including: receiving, from a user computer that is a party to a transaction and at a server computer, information that can be used to identify a transaction between the user computer and a resource provider computer. The method also includes determining, by the server computer and from a database, one or more attributes associated with the transaction and one or more attributes associated with the resource provider computer. The method also includes presenting, by the server computer, a first question pertaining to the transaction based at least in part on the accessed one or more attributes associated with the identified transaction and the accessed one or more attributes associated with the resource provider computer. The method also includes receiving, from the user computer and by the server computer, a response to the first question. The method also includes presenting, by the server computer, a second question pertaining to the transaction based at least in part on the received response to the first question. The method also includes receiving, from the user computer and by the server computer, a response to the second question. The method also includes storing, by the server computer, the received first response and the received second response in a data storage element, where the data storage element is accessible by an authorizing entity computer. Other embodiments of this aspect include corresponding computer systems, apparatus, and computer programs recorded on one or more computer storage devices, each configured to perform the actions of the methods.

Implementations may include one or more of the following features. The method where the data storage element is accessible by the authorizing entity computer via an online resolution analysis system. The method where the information that can be used to identify the transaction between the user computer and a resource provider computer is received via an application associated with the resource provider computer executing on the user computer. The method where the one or more attributes associated with the transaction and the one or more attributes associated with the resource provider computer are determined automatically by the server computer by receiving only an identifier associated with the user computer. The method where the first question and the second question are part of an interview script that is automatically created using a machine learning algorithm, the machine learning algorithm including a neural network or a k-means algorithm. The method where the first question and the second question are part of an interview script that is automatically created using data from a processing network that operates as a switch. The method further including providing, by the server computer and to the user computer, one or more options for answering the first and second questions. The method where the one or more options are based at least in part on the response to the first question, the response to the second question, the accessed one or more attributes associated with the identified transaction, or the accessed one or more attributes associated with the resource provider computer. The method where the one or more options are based at least in part on a ruleset applied to the dispute, where the ruleset is based at least in part on the accessed one or more attributes associated with the resource provider computer. The method where the first question and the second question are generated by a machine learning model. Implementations of the described techniques may include hardware, a method or process, or computer software on a computer-accessible medium.

One general aspect includes a server computer, including: a processor; and a non-transitory computer readable medium, the non-transitory computer readable medium including computer executable code for executing a method for resolving a dispute, the method including. The server computer also includes receiving, from a user computer that is a party to a transaction, information that can be used to identify a transaction between the user computer and a resource provider computer. The server computer also includes determining, from a database, one or more attributes associated with the transaction and one or more attributes associated with the resource provider computer.

The server computer also includes presenting a first question pertaining to the transaction based at least in part on the accessed one or more attributes associated with the identified transaction and the accessed one or more attributes associated with the resource provider computer. The server computer also includes receiving, from the user computer, a response to the first question. The server computer also includes presenting a second question pertaining to the transaction based at least in part on the received response to the first question. The server computer also includes receiving, from the user computer, a response to the second question. The server computer also includes storing the received first response and the received second response in a data storage element, where the data storage element is accessible by an authorizing entity computer. Other embodiments of this aspect include corresponding computer systems, apparatus, and computer programs recorded on one or more computer storage devices, each configured to perform the actions of the methods.

DETAILED DESCRIPTION

Figure 1:
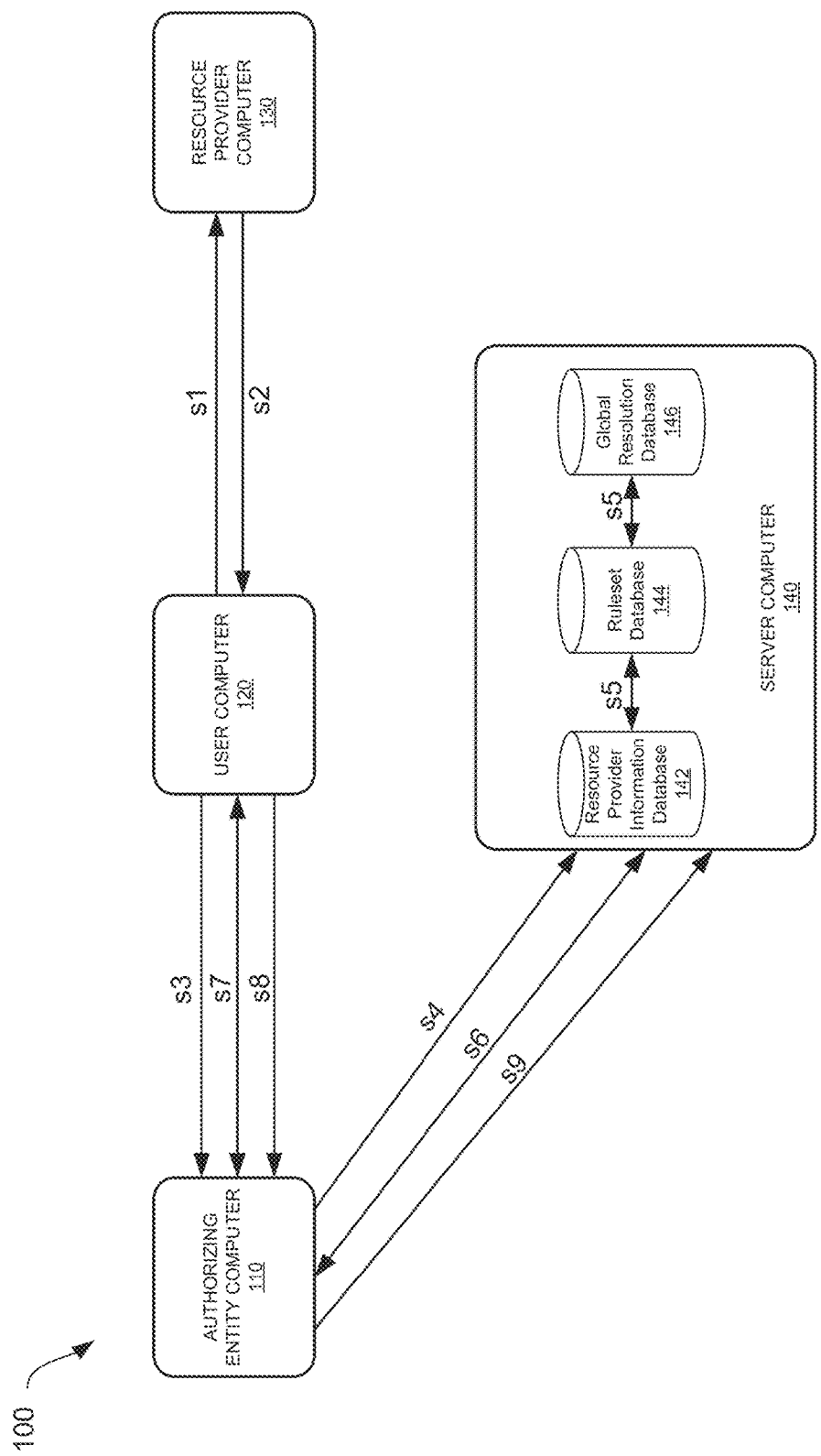
FIG. 1 shows a block diagram of an online resolution analysis system, according to some embodiments.

Prior to discussing embodiments of the invention, descriptions of some terms may be helpful in understanding embodiments of the invention.

A "user computer" may be a computer operated by a user. Exemplary user computers may include mobile communication devices. A "mobile communication device" may be an example of a "communication device" that can be easily transported. A mobile communication device may also have remote communication capabilities. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as vehicles such as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. Suitable payment devices can be hand-held and compact so that they can fit into a user's wallet and/or pocket (e.g., pocket-sized). Example payment devices may include smart cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "user" may include an individual. In some embodiments, a user may be associated with one or more personal accounts and/or mobile devices. The user may be a cardholder, an account holder, or a consumer in some embodiments.

A "resource provider" may be an entity that can provide a resource such as goods, services, information, and/or locations. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer.

An "issuer" may typically refer to a business entity (e.g., a bank) that maintains an account for a user. An issuer may also issue payment credentials stored on a portable device, such as a cellular telephone, smart card, tablet, or laptop to the consumer.

A "resolution analysis system" may be a system that is involved in the process of resolving disputes between parties. A dispute may be a situation in which a user questions the validity of a transaction that was registered to his/her account. Users may dispute charges for a variety of reasons, including unauthorized charges, excessive charges, failure by the merchant to deliver merchandise, defective merchandise, dissatisfaction with the product(s) or service(s)

received, or billing errors. The resolution analysis system may facilitate the resolution of such disputes by gathering information associated with the dispute and resolving the dispute in favor of one party or another. A resolution analysis system may be a dispute resolution system.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers that services the requests of one or more client computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

FIG. 1 shows a block diagram of an online resolution analysis system 100, according to some embodiments. The online resolution analysis system 100 may include an authorizing entity computer 110, user computer 120, resource provider computer 130, and server computer 140. Each of the authorizing entity computer 110, user computer 120, resource provider computer 130, and server computer 140 may be communicatively coupled to each other via an interconnected network, such as at the Internet.

The online resolution analysis system 100 may gather information pertaining a dispute by using a series of prompts to identify the information necessary to resolve a dispute (e.g., a disputed transaction). Traditionally, this information may be collected from a user of the user computer 120 by an agent or a caseworker associated with the authorizing entity computer 110. The agent or caseworker may ask questions to the user, obtain the necessary information, open a ticket, and perform further investigation pertaining to the dispute. The online resolution analysis system 100 is more efficient than conventional dispute resolution systems, since it can automatically gathering this information, without the need for an agent or caseworker. The online resolution analysis system 100 can do this by producing a series of unique prompts to be presented to the user via the user computer 120. Answers provided by the user of the user computer 120 to the series of prompts are used to obtaining the information needed to resolve the dispute. The series of prompts may be generated via a machine learning model where the prompts may be generated in real-time based on the user's responses to prior prompts and based on additional knowledge of the transaction. Suitable machine learning models may be based on algorithms including: neural networks, decision trees, support vector methods, and K-means algorithms. The online resolution analysis system 100 may also provide for the automatic gathering of facts associated with a disputed transaction which may also be used in the resolution process. Other details regarding the online resolution analysis system 100 and the functions that it can perform are provided below.

At step s1, the user computer 120 initiates a transaction with the resource provider computer 130. The resource provider computer 130 may be associated with a merchant that provides goods or services for purchase. The transaction initiated by the user computer 120 may be for one or more goods or services available from the merchant that the user of the user computer 120 wishes to purchase. The resource provider computer 130 may include or operate an access device and the user computer 120 may interface with the resource provider computer 130 to begin the transaction. Upon the transaction being initiated, the transaction may proceed and complete according to any known payment transaction protocols. That is, upon the transaction being approved, an account associated with the user of the user computer 120 may be debited in the amount of the total goods or services purchased from the merchant. Further details regarding a typical payment transaction are described below, with reference to FIG. 5.

In some examples, the user computer 120 may be a smartphone device, tablet, wearable device, etc. In some examples, the user computer 120 can be a physical payment card that used for interacting with the resource provider computer 130. Accordingly, the online resolution analysis system 100 may support both card present and card-not-present transactions.

At step s2, after the user computer 120 initiates the transaction with the resource provider computer 130, the merchant associated with the resource provider computer 130 may dispatch the goods to the user of the user computer 120. For example, if the transaction was an in-person transaction at a merchant location, the user may take the goods with him/her as he/she exits the merchant location upon the transaction being completed. In another example, if the transaction was an online transaction, the goods may be shipped to the user of the user computer 120.

At step s3, after the merchant associated with the resource provider computer 130 dispatches the goods to the user of the user computer 120, the user of the user of the user computer 120 may initiate a dispute process against a merchant associated with the resource provider computer 130, with the authorizing entity computer 110. The user may initiate a dispute process for the transaction completed in step s2 for any number of reasons, including unauthorized charges, excessive charges, failure by the merchant to deliver merchandise, defective merchandise, dissatisfaction with the product(s) or service(s) received, or billing errors. Additionally, the user may initiate the dispute process if attempts to come to a resolution directly with the merchant have been unsuccessful. For example, if the user received a defective product from the merchant, and the merchant refuses to issue a refund to the user for the defective product, the user may initiate the dispute process.

At step s4, after the user of the user of the user computer 120 initiates the dispute process with the authorizing entity computer 110, the authorizing entity computer 110 may notify the server computer 140 of the initiated dispute, and the server computer 140 may perform real-time research pertaining to the disputed transaction. The server computer may be an online resolution analysis server computer. In some embodiments, the user, using the user computer 120, may only need to supply basic information such as the account number of the payment account used to conduct the transaction, the merchant name, and/or the date (and/or time) of the transaction. In some cases, even the credit or debit card account number need not be provided, as the device identifier (e.g., a phone number) of the user computer 120 may be linked to the user's debit or credit card number, and the server computer 110 may automatically determine the credit or debit card account used by the user computer 120. By only requiring the user to provide basic information related to the transaction, the user experience is improved and there may be less friction when a user attempts to initiate a dispute.

The research performed by the server computer may include gathering information or attributes associated with the disputed transaction and information or attributes associated with the merchant. For example, the server computer 140 may determine the good/service for which the transaction was completed, the amount of the transaction, the time of the transaction, the date of the transaction, which type of device the transaction was initiated from, a website associated with the transaction, the user's shipping address, and/or the user's billing address. In a further example, the server computer 140 may also determine a name associated with the merchant, a name of a parent organization associated with the merchant, a physical address associated with the merchant, prior history associated with the merchant, and fraud data associated with transactions in which the merchant was involved. The information or attributes associated with the merchant may be obtained from the resource provider information database 142 within the server computer 140. Other information regarding the attributes of the transaction may be obtained from a variety of the sources of information, including the resource provider computer 130 which may store records of the specific items purchased by the user at the particular resource provider, the authorizing entity computer 110, which may have data regarding the time of authorization as well as the user's prior transaction history, and a processing network (see 550 in FIG. 5).

The processing network may be a "switch" that resides between a plurality of acquirers (and their merchants) and issuers, and may route and log transactions occurring between these entities. It may, for example, transport and log decline and chargeback messages, and this information may be used to drive the online resolution interview script as explained below. For instance, in some embodiments, the processing network may see that a particular merchant X has had a disproportionate number of chargebacks in the past 24 hours relative to other merchants in the same merchant category. Thus, in the initial dispute request provided by the user to the authorizing entity computer 110 and the server computer 140, the user may only need to provide his or her credit or debit card account number. In some cases, even the credit or debit card account number need not be provided, as the device identifier (e.g., a phone number) of the user computer 120 may be linked to the user's debit or credit card number, and the server computer 110 may automatically determine the credit or debit card account used by the user computer 120. The server computer 110 may recognize that it is likely that the user is calling about problems with merchant X. The server computer 110 may then prompt the user, without any information other than the user's credit or debit card number, "Are you calling about merchant X?".

Other information that may drive the interview script with the user may include information from the global resolution database 146. This database may include data regarding disputes with other users. The dispute data in the global resolution database 146 may contain information on disputes between a large number of merchants and users (and their issuers). Unlike the data that may reside in the processing network described above, the data in the global resolution database 146 may contain more detailed information regarding disputes (e.g., at least the name of the user, the name of the merchant, the amount of the dispute, the resolution of the dispute, the acquirer, and the issuer). The data in the processing network, however, may contain more up to date and real time transaction information as a large number of disputes may not yet have been initiated, but the data from other transactions processed by the processing network may be used to predict the nature of the dispute that the user is currently involved in.

Similar to the above example, if the global resolution database 146 has seen a rise in the number of disputes about merchant X for a particular product Y over the last week, this information may be used to drive an interview script with the current user. For example, the server computer 110 may then prompt the user, without any information other than the user's credit or debit card number, "Are you calling about product Y offered for sale by merchant X?" In this scenario, the user need not fill out a form, or even type in or articulate the name of the product or merchant involved in the dispute, but only needs to reply "yes" or "no." Compared to conventional systems, this can provide for much faster processing and can result in less human error (e.g., as may result from the user typing in or providing incorrect information).

At step s5, after the server computer 140 performs real-time research pertaining to the disputed transaction, the server computer 140 may access a ruleset database 144 in order to determine further actions to take. The ruleset database 144 may contain rules that can be used for determining a set of questions or interactions to ask to the user initiating the dispute, define responses, define processes, and define possible results to the interactions with the user. The ruleset database 144 may contain different sets of rules (merchant customizable ruleset) depending on the merchant for which the dispute is initiated against. For example, a merchant that is an airline may have a different set of prompts than a merchant that is an electronics store. The ruleset database 144 may also contain different sets of rules (issuer customizable ruleset) depending on the authorizing entity involved with the disputed transaction.

The following examples may help illustrate a set of questions or interactions that can be asked the user within different use cases. If the user initiates a dispute regarding cancelled/returned merchandise and the merchant is an online ticket retailer, the ruleset database 144 may include a rule that concludes that the ticket is for an event and the user may be advised about the available cancellation policy and the liability per the terms and conditions of the merchant. If the user initiates a dispute regarding cancelled/returned merchandise and the merchant is an Internet Service Provider (ISP), the user may be asked to approve an automatic blocking of all future recurring transactions from that merchant as part of the dispute resolution process. If the user is initiating a dispute for a fraudulent transaction, the ruleset database 144 may include a rule(s) that if the card was used at any compromised merchant location during a certain time window, to flag the user's card as potentially compromised. Additional questions may be presented to the user to approve the automatic blocking of the card, confirmation to reissue a new card, and the user's preferred shipping method to receive the new card.

At step s6, after the server computer 140 accesses a ruleset database 144 in order to determine further actions to take, the server computer 140 may invoke an online session with the user computer 120. The online session may be used by the server computer 140 to obtain more information and facts related to the disputed transaction from the user of the user computer 120. The information and facts gathered by the server computer 140 from the user may be information and facts that typically would require a live agent or caseworker associated with the authorizing entity computer 110 to gather. The information and facts related to the dispute may be obtained by the server computer 140 and from the user by causing a series of questions to be presented to the user via the user computer 120. The series of questions may be dynamic in nature, in the sense that the questions to be presented may depend on the user's response to previously asked questions. The online session may be initiated by the server computer 140 with the user computer 120 via the authorizing entity computer 110. For example, the online session may be initiated via an issuer application associated with the authorizing entity computer 110 that is being executed on the user computer 120.

At step s7, after the server computer 140 invokes an online session with the user computer 120 (e.g., either directly or through the authorizing entity computer 110), the server computer 140 may cause a first question to be presented to the user, via the user computer 120. The first question presented may be based on the accessed ruleset database 144 in step s5. For example, the first question presented may ask the user which good or service he/she would like to dispute, if more than one good or service was involved in the disputed transaction. In another example, the first question may ask about the user's history with the merchant by asking the user how many times in the past six months the user has conducted transactions with the merchant.

At step s8, after the server computer 140 causes the first question to be presented to the user via the user computer 120, the user may input a response to the question via the user computer 120. The user may select from a list of responses or may manually enter a response to the presented first question. The user's response may then be relayed back to the server computer 140, via the authorizing entity computer 110, by the user computer 120. At step s9, the server computer 140 may register and log the user's response to the first question presented to the user.

At this point, step s7 may repeat such that the server computer 140 may cause a second question to be presented to the user, via the user computer 120. The second question presented may also be based on the accessed ruleset database 144 in step s5 in addition to the response to the first question that was registered and logged in step s9. In other words, the response to the first question presented to the user may influence the second question that is presented to the user. For example, if the first question asked the user which good or service he/she would like to dispute, and the user responded that the good was a television set, the second question may ask the user what may be wrong with the television set and provide the following options as responses to the second question: (1) Does not turn on; (2) No volume; (3) Physical Damage; (4) Other. In this way, the online resolution analysis server computer (e.g., server computer 140) may intelligently gather the appropriate information and facts from the user of the user computer 120 that would typically require a caseworker or live agent to gather. The intelligent gathering of the appropriate information and facts may provide numerous advantageous including an improved user experience, efficiency, and cost savings for the authorizing entity computer 110.

This process may repeat for each subsequent question presented to the user until the server computer 140 determines that it has gathered enough facts or information pertaining to the dispute in order to take an action on the dispute or present the gathered information for further analysis by a caseworker or live agent. Referring back to step s9, after responses for all the presented questions are received, the responses may be stored in a data storage element which may later be accessed by a third-party. In some embodiments, the third-party may be the same as the authorizing entity computer 110, or may be an independent dispute resolution party that may make a decision to resolve the dispute.

Further details of the server computer 140 are described in the following description.

Figure 2:
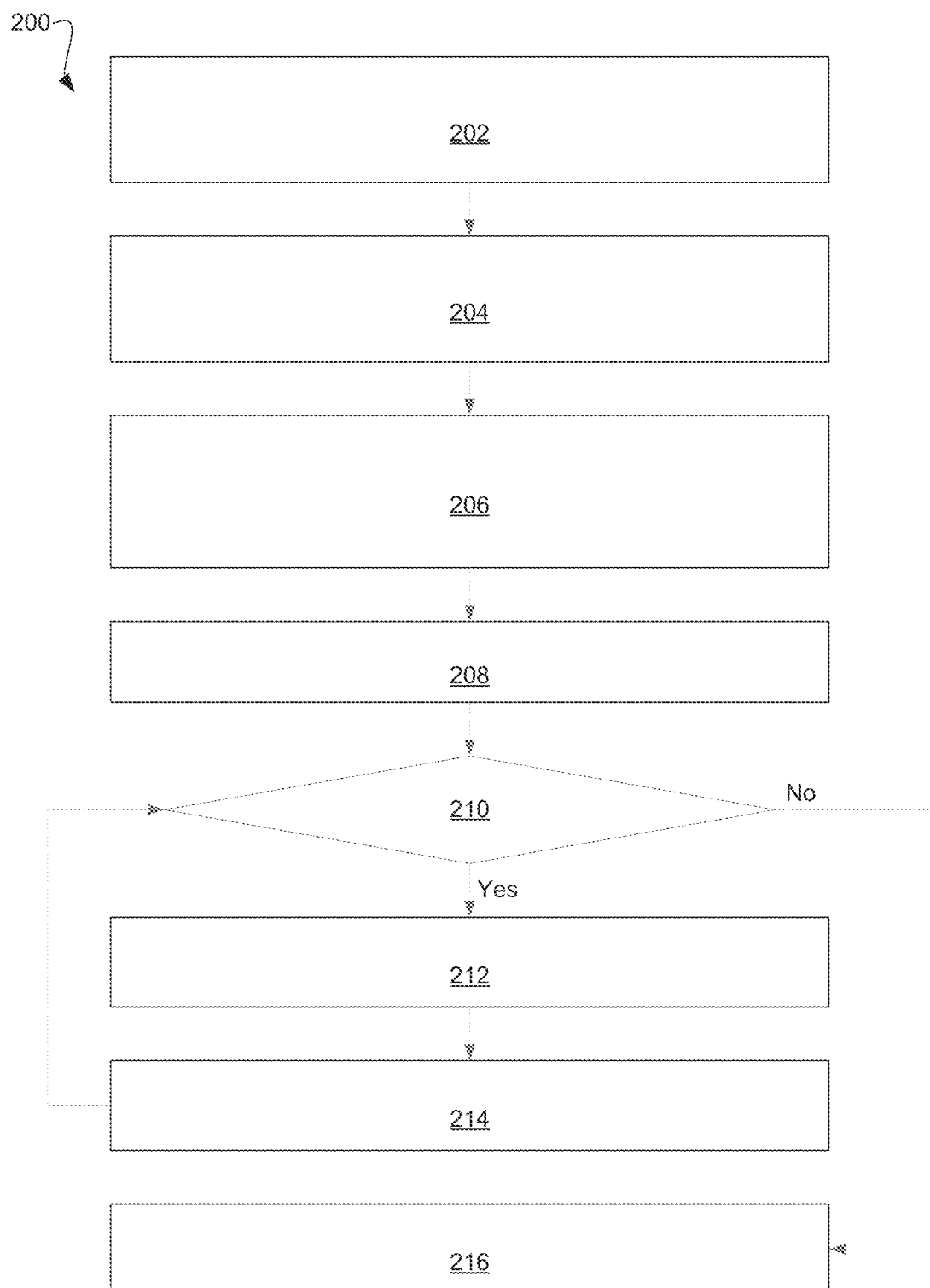
FIG. 2 shows a flowchart illustrating a process for online dispute resolution analysis, according to some embodiments.

FIG. 2 shows a flowchart 200 illustrating a process for online dispute analysis. At step 202, information identifying a transaction between a user computer 120 and a resource provider computer 130 may be received by the server computer 140. This information may be received in response to a user of the user computer 120 initiating a dispute against a merchant associated with the resource provider computer 130. For example, the user may have purchased goods from the merchant that the user has found unsatisfactory and for which a the user and the merchant could not come to a resolution on their own. The information identifying the transaction may include information identifying that the user has initiated the disputed. This information may include a user device identifier (e.g., a phone number, serial number, secure element ID, etc.), a primary account number (e.g., a credit or debit card account number), or any other user ID. Other information might include the products purchased, or the merchant at which the user has transacted. However, the information identifying the transaction is preferably minimized to improve the speed of processing. Transaction information can also be identified from the purchase statement, for example if the cardholder decides to initiate dispute from the monthly statement. In some cases, the information may or may not directly relate to the actual transaction. For example, only a phone number may be provided by the user and the system can determine the remainder of the information from data collected by the system, and prompts to the user. In some embodiments, the user may have initiated the dispute via an issuer application associated with an authorizing entity computer 110 and executing on the user computer 120.

At step 204, one or more attributes associated with the identified transaction and one or more attributes associated with the resource provider computer 130 may be accessed by the server computer 140 from the resource provider information database 142. The one or more attributes associated with the identified transaction may include, but is not limited to, a transaction amount, transaction date, transaction time, transaction type, item name, website address, shipping address, or billing address. The one or more attributes associated with the resource provider computer may include, but is not limited to, of a resource provider computer name, parent organization name, resource provider computer address, resource provider computer history, or fraud data. The server computer may also access a ruleset database 144 in order to determine further actions to take. The ruleset database 144 may contain rules that can be used for determining a set of questions or interactions to ask to the user initiating the dispute, define responses, define processes, and define possible results to the interactions with the user. The ruleset database 144 may contain different sets of rules depending on the merchant for which the dispute is initiated against. The global resolution database 146 may contain data regarding past disputes by other users (and their issuers) and/or merchants (and their acquirers).

At step 206, the server computer 140 may cause the presentation of a first question pertaining to the transaction based at least in part on the accessed one or more attributes associated with the identified transaction and the accessed one or more attributes associated with the resource provider computer 130. The first question may be presented to the user via the user computer 120 and for the purposes of aiding in obtaining the information necessary to resolve the dispute. For example, an issuer application executing on the user computer 120 may present the first question to the user via a user interface (UI) of the issuer application. The first question presented may be based on the accessed ruleset database 144 in step 204. For example, the first question presented may ask the user which good or service he/she would like to dispute, if more than one good or service was involved in the disputed transaction. In another example, the first question may ask about the user's history with the merchant by asking the user how many times in the past six months the user has conducted transactions with the merchant. In some embodiments, the first question to be presented to the user may be generated by a machine learning model, where the machine learning model may take as inputs the rules in the ruleset database, one or more attributes associated with the identified transaction, or one or more attributes associated with the resource provider computer 130.

At step 208, the server computer 140 may receive, from the user computer 120, a response to the first question that was presented to the user in step 206. The user's response may have been selected from a list of responses or may have been manually entered by the user. As described further below, the user's response to the first question may influence the next question, if any, to be presented to the user.

At step 210, the server computer 140 may determine whether any additional questions need to be presented to the user in order to aid in obtaining the information necessary to resolve the dispute or prepare information for a third-party to resolve the dispute. If the server computer 140 determines that no further questions are needed to be presented to the user, the method may continue to step 216. Otherwise, if the server computer 140 determines that additional questions need to be presented to the user, the method may continue to step 212.

At step 212, if the server computer 140 determined that additional questions need to be presented to the user, the server computer 140 may present another question pertaining to the transaction based at least in part on responses to previous questions. In other words, the response to the first question presented to the user may influence the second question that is presented to the user. In this manner, the server computer 140 may intelligently gather the appropriate information and facts from the user of the user computer 120 that would typically require a caseworker or live agent to gather. In some embodiments, each question subsequent to the first question may also be generated by the machine learning model described above. The series of questions presented to the user may be used for gathering information on the user's side of the story pertaining to the dispute. The automated and intelligent question asking process may reduce the amount of resources required by the authorizing entity computer 110 and avoid costly calls to reference centers. Responses to the questions may be used to reference trends identified through historical transaction analysis and merchant performance, incorporating risk models, and learning from interactions providing intelligent and predictive responses throughout the questionnaire exchange.

At step 214, the user may provide a response to a question presented to the user subsequent to the first question presented to the user. The response to the question may be recorded and the process may then return again to step 210 where the server computer 140 may again determine whether any additional questions need to be presented to the user in order to aid in obtaining the information necessary to resolve the dispute or prepare information for a third-party to resolve the dispute. If the server computer 140 determines that no further questions are needed to be presented to the user, the method may continue to step 216. Otherwise, if the server computer 140 determines that additional questions need to be presented to the user, the method may continue to step 212. This process may repeat and further subsequent questions may be presented to the user until the process continues to step 216.

At step 216, the server computer 140 may store the received responses for all of the presented questions in a data storage element. The data storage element may later be accessed by a third-party. In some embodiments, the third-party may be the same as the authorizing entity computer 110, or may be an independent dispute resolution party that may make a decision to resolve the dispute. The data storage element may be accessible via the online resolution analysis system, for example, by accessing an application programming interface (API). The third-party may be authorized to enforce a payment refund from the resource provider computer 130 to the authorizing entity computer 110 based at least in part on data stored in the data storage element. In some embodiments, the user may be presented with different options for resolving the dispute. The options may be based on the responses to the questions, the accessed one or more attributes associated with the identified transaction, the accessed one or more attributes associated with the second party, or the accessed ruleset. For example, the one or more options may include a full refund for the disputed transaction, a replacement good for a defective purchased good, a store credit, etc.

Figure 3:
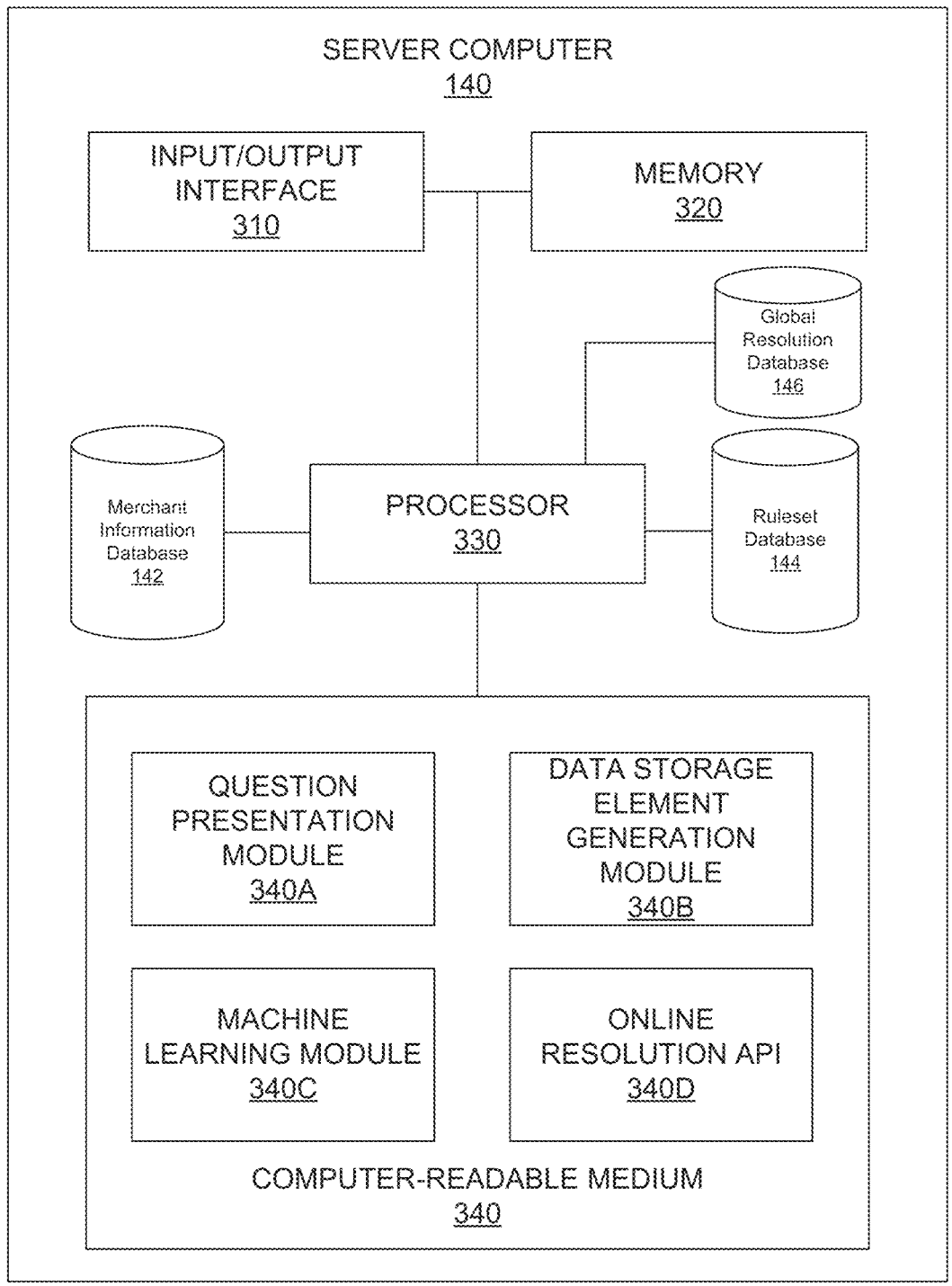
FIG. 3 shows a server computer, according to some embodiments.

FIG. 3 shows a server computer 140, according to some embodiments. The components of server computer 140 may be used to implement an online resolution analysis server computer. The server computer 140 includes an input/output interface 310, a memory 320, a processor 330, a resource provider information database 142, a ruleset database 144, a global resolution database 146, and a non-transitory computer-readable medium 340. In some embodiments, server computer 140 may reside within a payment processing network cloud or may also operate as a subsystem of the authorizing entity computer 110.

The input/output (I/O) interface 310 is configured to receive and transmit data from external devices or apparatuses. For example, the I/O interface 310 may receive a dispute initiation request from a user computer 120. The I/O interface 310 may also be used for direct interaction with the server computer 140. The server computer 140 may accept input from an input device such as, but not limited to, a keyboard, keypad, or mouse. Further, the I/O interface 140 may display output on a display device.

Memory 320 may be any magnetic, electronic, or optical memory. It can be appreciated that memory 320 may include any number of memory modules. An example of memory 320 may be dynamic random access memory (DRAM).

Processor 330 may be any general-purpose processor operable to carry out instructions on the server computer 140. The processor 330 is coupled to other units of the server computer 140 including input/output interface 310, memory 320, and computer-readable medium 340.

Computer-readable medium 340 may be any magnetic, electronic, optical, or other computer memory device. In some embodiments, the computer readable medium 340 may comprise code, executable by the processor 330 for implementing a method comprising: receiving, from a user computer that is a party to a transaction and at a server computer, information identifying a transaction between the user computer and a resource provider computer; accessing, by the server computer and from a database, one or more attributes associated with the identified transaction and one or more attributes associated with the resource provider computer; presenting, by the server computer, a first question pertaining to the transaction based at least in part on the accessed one or more attributes associated with the identified transaction and the accessed one or more attributes associated with the resource provider computer; receiving, from the user computer and by the server computer, a response to the first question; presenting, by the server computer, a second question pertaining to the transaction based at least in part on the received response to the first question; receiving, from the user computer and by the server computer, a response to the second question; and storing, by the server computer, the received first response and the received second response in a data storage element, wherein the data storage element is accessible by an authorizing entity computer.

The computer-readable medium 340 may also include a question presentation module 340A, a data storage element generation module 340B, a machine learning module 340C, and an online dispute resolution API 340D.

The question presentation module 340A may comprise code that, when executed by processor 330, can cause the presentation of one or more questions to be displayed to a user via the user computer 120. The question presentation module 340A may transmit data to the user computer 120, either directly or via the authorizing entity computer 110, pertaining to the question(s) to be presented. The question presentation module may either directly generate the question(s) to be presented according to the attributes and rulesets described above, or may interface with the machine learning module 340C to obtain question(s) generated by the machine learning module. The question presentation module 340A may also facilitate the receipt of responses to the questions provided by the user via the user computer 120.

The data storage element generation module 340B may comprise code that, when executed by processor 330, generates a data storage element comprising the responses to the questions presented to the user, the responses provided by the user via the user computer 120. The generated data storage element may also include additional information pertaining to the transaction that was gathered by the server computer 140 (e.g., data accessed from the resource provider information database 142, the ruleset database 144, and/or the global resolution database 146). In some embodiments, the data storage element may be encrypted. The data storage element may be accessible by a third-party dispute resolution entity via the online dispute resolution API 340D.

The machine learning module 340C comprise code that, when executed by processor 330, that can learn from and make predictions on data. For example, the machine learning module 340C may generate a question for presentation to the user based on the accessed one or more attributes associated with the identified transaction and the accessed one or more attributes associated with the resource provider computer 130. Additionally, the generated questions may also be based on the user's prior responses to previously presented questions. All of this data may be input to the machine learning module 340C and the machine learning model may then generate a question along with possible responses to the questions. The generated questions and response options may be transmitted to the question presentation module 340A, to facilitate presentation to the user of the user computer 120. The machine learning module 340C may use suitable machine learning models based on algorithms including, but not limited to: neural networks, decision trees, support vector methods, and K-means algorithms.

The online dispute resolution API 340D may comprise code that, when executed by processor 330, provides an accessible interface for third-party dispute resolution entities to access the data storage element generated by the data storage element generation module 340B. In one example, the online dispute resolution API 340D may provide for webpage access of the data storage element.

Figure 4A:
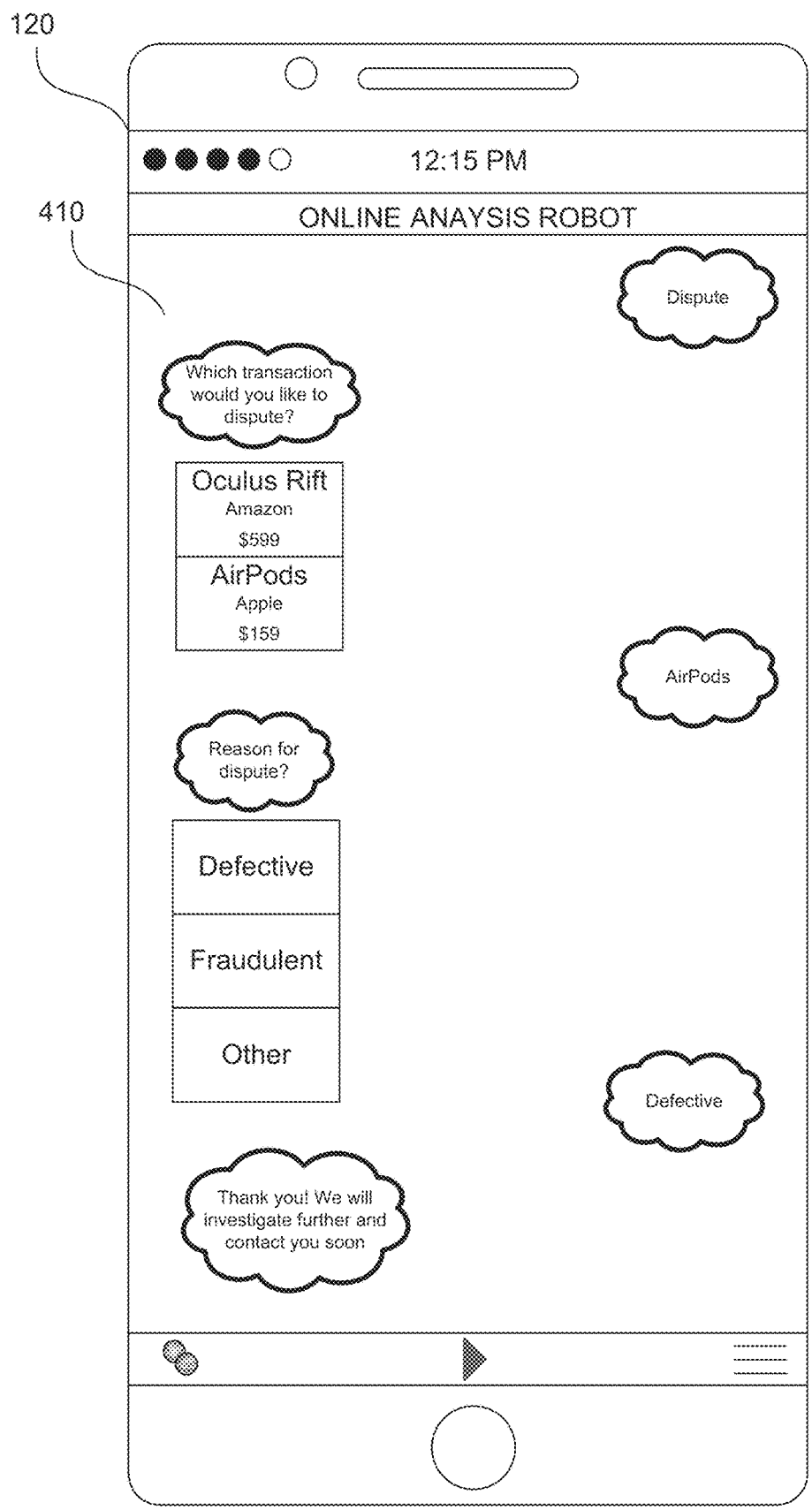
FIG. 4A shows another screenshot of a user interaction with the online dispute resolution system via a user interface of an application executing on the user computer 120, according to some embodiments.

FIG. 4A shows a screenshot of a user interaction with the online dispute resolution system via a user interface 410 of an application executing on the user computer 120, according to some embodiments. The user may initiate a dispute with the online dispute resolution system by selecting an option to "chat" with a dispute resolution robot. The dispute resolution robot may serve as the front-end for interaction with the user and may function as a result of the components described with respect to the server computer 140. Upon chatting with the dispute resolution robot, the user may express his/her desire to initiate a dispute by typing and sending the text "Dispute" to the robot. The robot may reply by asking the user which transaction the user would like to dispute. The robot may present a few response options outlining recent transactions the user has completed based on information gathered by the server computer 140 in accordance with the description above. In this example, the user's recent transactions include (1) a purchase for an Oculus Rift at the merchant Amazon for a transaction amount of $599 and (2) a purchase for AirPods at the merchant Apple for a transaction amount of $159. The user may respond by sending the text "AirPods," indicating that the user wishes to dispute the transaction involving the AirPods. The robot may then ask the user what the reason for the dispute is and present response options corresponding to typical reasons for a dispute. This question may be intelligent in the sense that server computer 140 may have knowledge that AirPods are an electronic item and electronic items are often disputed for being defective, an thus may present "defective" as one of the response options. The user may indicate that the AirPods are in fact defective by sending the text "Defective" to the robot. If the server computer 140 determines that no further questions need to be presented to the user prior to generating the data element for access by a third-party dispute resolution entity, the robot may respond by saying "Thank you! We will investigate further and contact you soon." The data storage element may then be created with the user's responses and any further information or facts gathered by the server computer 140 in accordance with the description above.

In some embodiments, upon an initial interaction with the dispute resolution robot, the user may first be presented with a list of recent transactions completed by the user. The user may then select to dispute one of the transactions by selecting a "Dispute" button presented next to the recent transactions that the user wishes to dispute. This may be begin the dispute process with the online dispute resolution robot. In some embodiments, the user may login to a website associated with the authorizing entity computer 110 or server computer 140 and select a "dispute" button next to a list of recent transactions presented to the user to begin the dispute process. In some embodiments, the user may receive transaction alerts at the user computer 120 as transactions are completed, and the user may select to dispute the transaction in response to the transaction alert. These are all examples of the process may be initiated to dispute a transaction.

Figure 4B:
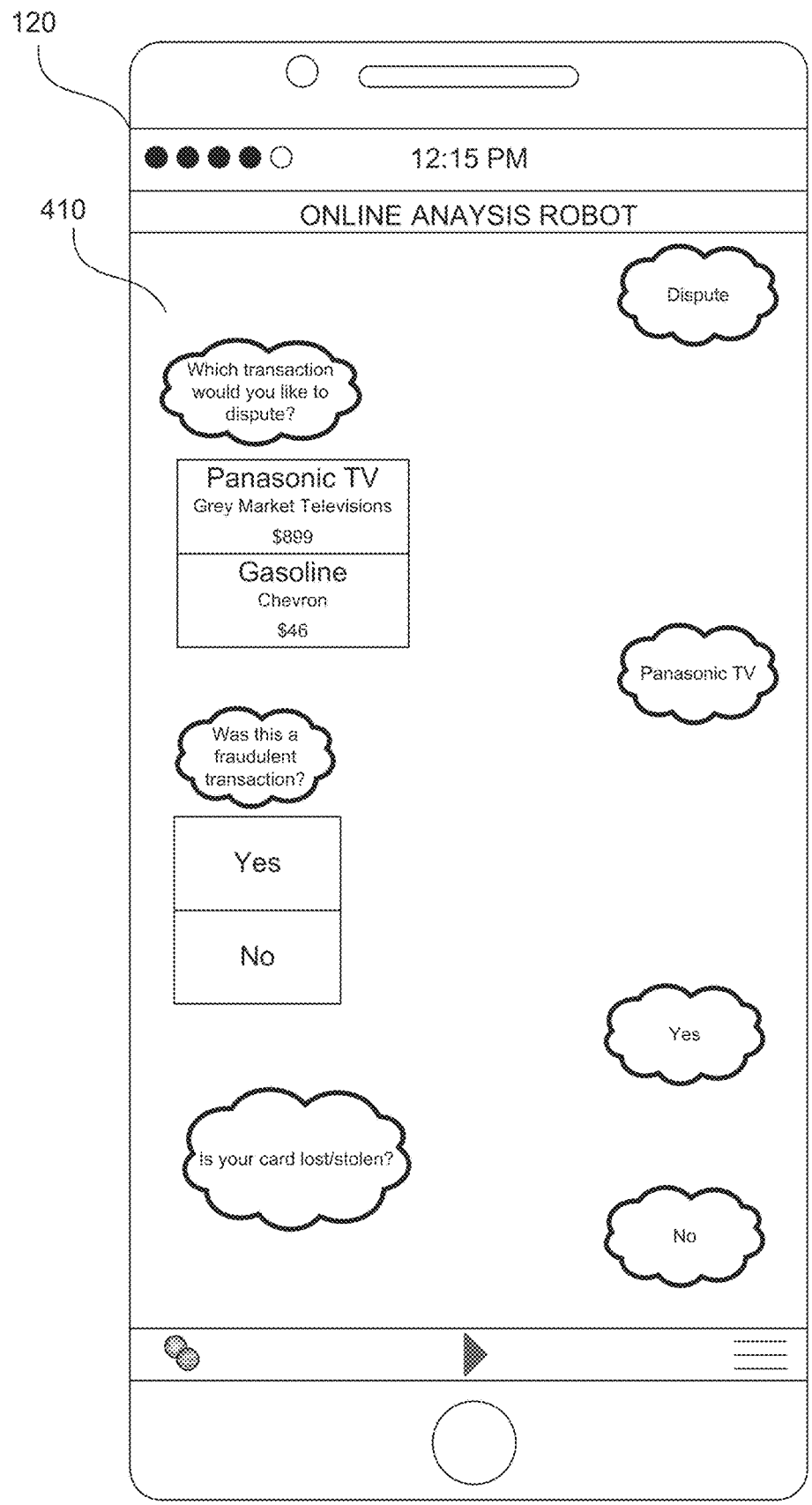
FIG. 4B shows another screenshot of a user interaction with the online dispute resolution system via a user interface of an application executing on the user computer 120, according to some embodiments.

FIG. 4B shows another screenshot of a user interaction with the online dispute resolution system via a user interface 410 of an application executing on the user computer 120, according to some embodiments. Similar to FIG. 4A, in this example, the user has also initiated a dispute with the online dispute resolution system. This time, the user has indicated that he wishes to dispute the transaction for a Panasonic TV at the merchant Grey Market Televisions for a transaction amount of $899. The server computer 140 may have gathered information or facts pertaining to Grey Market Televisions and may be aware that this merchant has had a large amount of disputes filed against them and thus may be a fraudulent merchant. Accordingly, the robot may then proactively ask the user if the transaction was a fraudulent transaction. This illustrates the intelligence of the presentation of the questions and how the subsequent questions are based on the user's responses to prior questions as well as information and facts gathered by the server computer 150 pertaining to the transaction and the merchant involved. The user may then respond that the transaction was fraudulent by typing and sending "Yes." The robot may then ask the user whether the user's card was lost or stolen since the user had indicated that this was a fraudulent transaction. The user may reply "No" indicating that the card is still in the user's possession. In this example, the server computer 150 may be able to provide a resolution to the dispute without the involvement of a third-party dispute resolution entity or without further interaction by a caseworker or agent of the authorizing entity computer 110. For example, the server computer 150 may be able provide the user with an immediate refund of the transaction amount because of the user's response that the transaction was fraudulent combined with the past history of the merchant being known as a fraudulent merchant.

Figure 5:
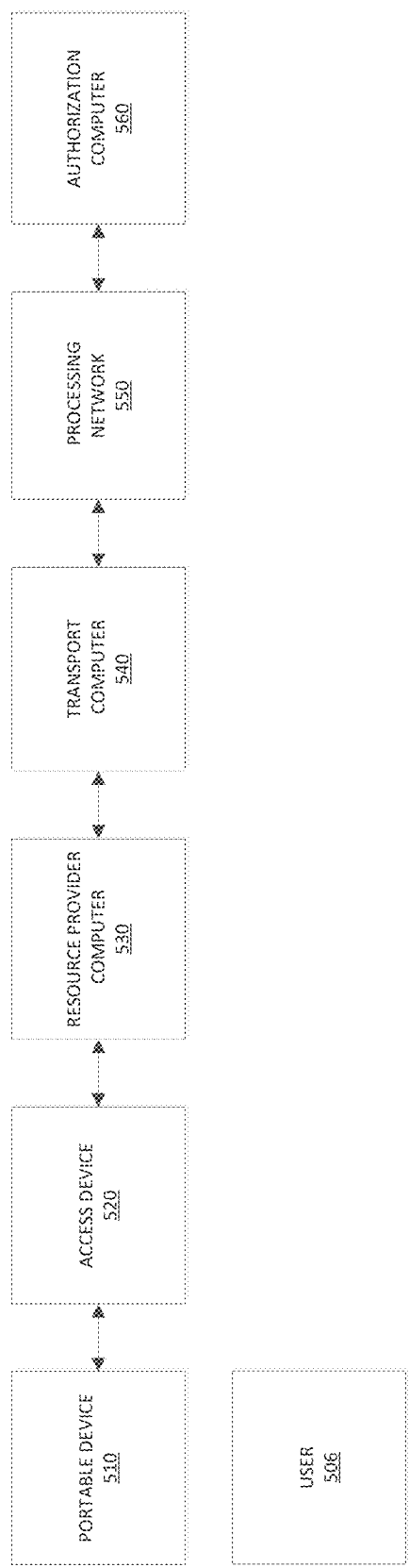
FIG. 5 shows a block diagram of a transaction processing system that can use a portable device with access data according to an embodiment of the invention.

FIG. 5 shows a block diagram of a transaction processing system that can use a portable device with access data. FIG. 5 shows a user 506 that can operate a portable device 510. The user 506 may use the portable device 510 to pay for a good or service at a resource provider such as a merchant. The resource provider may operate a resource provider computer 530 and/or an access device 520. The resource provider may communicate with an authorization computer 560 (e.g., an issuer computer) via a transport computer 540 (e.g., an acquirer computer) and a processing network 550 (e.g., a payment processing network).

The processing network 550 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system)

which processes authorization requests and a Base II system which performs clearing and settlement services. The payment processing network may use any suitable wired or wireless network, including the Internet.

A typical payment transaction flow using a portable device 510 at an access device 520 (e.g. POS location) can be described as follows. A user 506 presents his or her portable device 510 to an access device 520 to pay for an item or service. The portable device 510 and the access device 520 interact such that access data from the portable device 510 (e.g. PAN, a payment token, verification value(s), expiration date, etc.) is received by the access device 520 (e.g. via contact or contactless interface). The resource provider computer 530 may then receive this information from the access device 520 via an external communication interface. The resource provider computer 530 may then generate an authorization request message that includes the information received from the access device 520 (i.e. information corresponding to the portable device 510) along with additional transaction information (e.g. a transaction amount, merchant specific information, etc.) and electronically transmits this information to a transport computer 540. The transport computer 540 may then receive, process, and forward the authorization request message to a processing network 550 for authorization.

In general, prior to the occurrence of a credit or debit-card transaction, the processing network 550 has an established protocol with each authorization computer on how the issuer's transactions are to be authorized. In some cases, such as when the transaction amount is below a threshold value, the processing network 550 may be configured to authorize the transaction based on information that it has about the user's account without generating and transmitting an authorization request message to the authorization computer 560. In other cases, such as when the transaction amount is above a threshold value, the processing network 550 may receive the authorization request message, determine the issuer associated with the portable device 510, and forward the authorization request message for the transaction to the authorization computer 560 for verification and authorization. Once the transaction is authorized, the authorization computer 560 may generate an authorization response message (that may include an authorization code indicating the transaction is approved or declined) and transmit this electronic message via its external communication interface to processing network 550. The processing network 550 may then forward the authorization response message to the transport computer 540, which in turn may then transmit the electronic message to comprising the authorization indication to the resource provider computer 530, and then to the access device 520.

At the end of the day or at some other suitable time interval, a clearing and settlement process between the resource provider computer 530, the transport computer 540, the processing network 550, and the authorization computer 560 may be performed on the transaction.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software. Any of the above mentioned entities may operate a computer that is programmed to perform the functions described herein.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for automated analysis using machine learning, comprising:

receiving, at a server computer from an authorizing entity computer, a request to dispute a completed transaction of a user of a user computer, wherein the request includes a device identifier of the user computer;

identifying, by the server computer, credentials used in connection with a plurality of completed transactions based on the device identifier of the user computer, wherein the server computer stores a mapping between the device identifier and the credentials;

gathering in real-time, by the server computer from a database accessible by the server computer, additional information about the plurality of completed transactions based on the credentials, wherein the additional information includes an attribute associated with an item or a service provided in the plurality of completed transactions;

identifying in real-time, by the server computer among the plurality of completed transactions, an individual completed transaction conducted between the user and a resource provider based on the additional information, wherein the server computer is a third party with respect to the user and the resource provider;

initiating, by the server computer, an online session with the user computer based on the request and the additional information;

presenting, by the server computer, the individual completed transaction to the user computer as part of the online session;

receiving, by the server computer, a user input confirming the individual completed transaction as a selected completed transaction as part of the online session;

determining, by the server computer and from a database, a set of attributes including one or more attributes associated with the selected completed transaction and one or more attributes associated with the resource provider;

identifying, by the server computer, a ruleset applicable to the selected completed transaction at a ruleset database based on at least the set of attributes;
generating in real-time, by the server computer using a machine learning algorithm, a first question pertaining to the selected completed transaction based on the set of attributes and the ruleset applicable to the selected completed transaction;
presenting, by the server computer, the first question pertaining to the selected completed transaction to the user computer as part of the online session;
receiving, from the user computer and by the server computer, a first response to the first question as part of the online session;
generating, by the server computer using the machine learning algorithm, a second question based on the set of attributes, the ruleset applicable to the selected completed transaction and the first response;
presenting, by the server computer, the second question pertaining to the selected completed transaction to the user computer as part of the online session;
receiving, from the user computer and by the server computer, a second response to the second question as part of the online session; and
storing, by the server computer, the received first response and the received second response in a data storage element, wherein the data storage element is accessible by the authorizing entity computer that issued the credentials used in the individual completed transaction between the user and the resource provider.

2. The method of claim 1, wherein the data storage element is accessible by the authorizing entity computer via an online resolution analysis system.

3. The method of claim 1, wherein the credentials used in connection with the individual completed transaction based on the device identifier of the user computer are received via an application associated with the resource provider executing on the user computer.

4. The method of claim 1, wherein the one or more attributes associated with the selected completed transaction and the one or more attributes associated with the resource provider are determined automatically by the server computer based only on the device identifier associated with the user computer.

5. The method of claim 1, wherein the first question and the second question are part of an interview script that is automatically created using the machine learning algorithm, the machine learning algorithm including a neural network or a K-means algorithm.

6. The method of claim 1, wherein the first question and the second question are part of an interview script that is automatically created using data from a processing network that operates as a switch.

7. The method of claim 1, further comprising providing, by the server computer and to the user computer, one or more options for answering the first and second questions.

8. The method of claim 7, wherein the one or more options are based at least in part on the first response, the second response, the one or more attributes associated with the selected completed transaction, or the one or more attributes associated with the resource provider.

9. The method of claim 7, wherein the one or more options are based at least in part on the ruleset applied to the selected completed transaction.

10. The method of claim 1, wherein the one or more attributes associated with the resource provider includes prior transaction history of the resource provider.

11. A server computer, comprising:
a processor; and
a non-transitory computer readable medium, the non-transitory computer readable medium comprising computer executable code for executing a method for resolving a dispute, the method comprising:
receiving, from an authorizing entity computer, a request to dispute a completed transaction of a user of a user computer, wherein the request includes a device identifier of the user computer;
identifying credentials used in connection with a plurality of completed transactions based on the device identifier of the user computer, wherein the server computer stores a mapping between the device identifier and the credentials;
gathering in real-time, from a database accessible by the server computer, additional information about the plurality of completed transactions based on the credentials, wherein the additional information includes an attribute associated with an item or a service provided in the plurality of completed transactions;
identifying in real-time, among the plurality of completed transactions, an individual completed transaction conducted between the user and a resource provider based on the additional information, wherein the server computer is a third party with respect to the user and the resource provider;
initiating an online session with the user computer based on the request and the additional information;
presenting the individual completed transaction to the user computer as part of the online session;
receiving a user input confirming the individual completed transaction as a selected completed transaction as part of the online session;
determining, from a database, a set of attributes including one or more attributes associated with the selected completed transaction and one or more attributes associated with the resource provider;
identifying a ruleset applicable to the selected completed transaction at a ruleset database based on at least the set of attributes;
generating in real-time, using a machine learning algorithm, a first question pertaining to the selected completed transaction based on the set of attributes and the ruleset applicable to the selected completed transaction;
presenting the first question pertaining to the selected completed transaction to the user computer as part of the online session;
receiving, from the user computer, a first response to the first question as part of the online session;
generating, using the machine learning algorithm, a second question based on the set of attributes, the ruleset applicable to the selected completed transaction and the first response;
presenting the second question pertaining to the selected completed transaction to the user computer as part of the online session;
receiving, from the user computer, a second response to the second question as part of the online session; and
storing the received first response and the received second response in a data storage element, wherein the data storage element is accessible by the authorizing entity computer that issued the credentials used in the individual completed transaction between the user and the resource provider.

12. The server computer of claim 11, wherein the data storage element is accessible by the authorizing entity computer via an online resolution analysis system.

13. The server computer of claim 11, wherein the credentials used in connection with the individual completed transaction based on the device identifier of the user computer are received via an application associated with the resource provider executing on the user computer.

14. The server computer of claim 11, wherein the one or more attributes associated with the selected completed transaction and the one or more attributes associated with the resource provider are determined automatically by the server computer based only on the device identifier associated with the user computer.

15. The server computer of claim 11, wherein the first question and the second question are part of an interview script that is automatically created using the machine learning algorithm, the machine learning algorithm including a neural network or a K-means algorithm.

16. The server computer of claim 11, wherein the first question and the second question are part of an interview script that is automatically created using data from a processing network that operates as a switch.

17. The server computer of claim 11, wherein the method further comprises providing, by the server computer and to the user computer, one or more options for answering the first and second questions.

18. The server computer of claim 17, wherein the one or more options are based at least in part on the first response, the second response, the one or more attributes associated with the selected completed transaction, or the one or more attributes associated with the resource provider.

19. The server computer of claim 17, wherein the one or more options are based at least in part on the ruleset applied to the selected completed transaction.

\* \* \* \* \*